| United States Patent [19] | [11] | 4,245,057 |
|---|---|---|
| Slama | [45] | Jan. 13, 1981 |

[54] IMPACT RESISTANT POLYSTYRENE BLENDS

[75] Inventor: Francis J. Slama, Aurora, Ill.

[73] Assignee: Standard Oil Company (Indiana), Chicago, Ill.

[21] Appl. No.: 20,961

[22] Filed: Mar. 16, 1979

Related U.S. Application Data

[63] Continuation of Ser. No. 838,555, Oct. 3, 1977, abandoned.

[51] Int. Cl.³ .............................................. C08L 51/04
[52] U.S. Cl. ..................................... 525/84; 525/243; 525/313; 525/316
[58] Field of Search .......................................... 525/84

[56] References Cited

U.S. PATENT DOCUMENTS

| 3,041,312 | 6/1962 | Boyd | 526/173 |
|---|---|---|---|
| 3,459,832 | 8/1969 | Kern | 526/347.2 |
| 3,781,383 | 12/1973 | Finestone et al. | 525/84 |
| 4,073,831 | 2/1978 | Tobana et al. | 525/84 |

OTHER PUBLICATIONS

"Encyclopedia of Polymer Science & Technology", vol. 13, p. 395, John Wiley & Sons, Inc., 1970.

*Primary Examiner*—J. Ziegler
*Attorney, Agent, or Firm*—Stephen L. Hensley; William T. McClain; William H. Magidson

[57] ABSTRACT

Impact resistant compositions comprise a blend of a styrene polymer having a number average molecular weight from about 200,000 to 600,000, and a rubber-modified styrene polymer prepared by mass polymerization of a solution of a rubber in styrene monomer.

20 Claims, No Drawings

IMPACT RESISTANT POLYSTYRENE BLENDS

This is a continuation of application Ser. No. 838,555, filed Oct. 3, 1977, now abandoned.

BACKGROUND OF THE INVENTION

This invention relates to impact resistant compositions and a process therefor. More particularly, the invention relates to impact resistant styrene polymer blends and the production thereof at high rates.

It is known that the impact strength and other physical properties of styrene polymers can be improved by combining such polymers with compositions containing a rubber. Although maximum increases in impact strength are generally exhibited by rubber-modified styrene polymers such as are prepared by interpolymerization of a rubber and styrene monomer, impact resistant compositions also may be prepared by blending certain compositions containing a rubber with styrene polymers. Exemplary of prior art efforts to prepare such impact resistant blends is U.S. Pat. No. 3,637,554 to Childers wherein improvements in impact strength and other physical properties are achieved by blending with a commercial polystyrene resin, a branched block copolymer having a polyfunctional nucleus to which are bonded from three to seven chains of a block copolymer prepared from a conjugated diene and a vinyl substituted aromatic compound.

U.S. Pat. No. 3,781,383 to Finestone et al. discloses impact resistant rubber-modified styrene polymers and the blending of such polymers with styrene homopolymers to obtain impact resistant blends. Although it is shown that the impact strengths of the disclosed rubber-modified styrene polymers exceed the impact strengths of blends containing such a rubber-modified polymer and a styrene homopolymer, blending can be carried out without losing the effectiveness of the rubber-modified material as a toughening agent and it is possible to prepare blends of predetermined impact strength. The disclosed rubber-modified styrene polymers are prepared by mass polymerizing a polymerization feedstock comprising a solution of rubber in styrene monomer with the addition of at least 0.005 wt. % of a mercaptan chain transfer agent to the feedstock when about 2 to 15 wt. % of the monomer has been converted to polymer.

U.S. Pat. No. 3,906,058 to Durst also relates to impact resistant compositions and the preparation thereof. It is taught that such compositions may be prepared by blending a first component consisting essentially of homopolymerized styrene having a number average molecular weight ranging from about 50,000 to 500,000, and a graded block copolymer of styrene and butadiene.

Prior art efforts, such as the above-described references, have resulted in impact resistant blends which are suitable for use in molding and other applications. However, difficulties are encountered in the preparation of such blends in that suitable impact strengths are often achieved only through the use of specially prepared components which add cost and time delays to the preparation of the blends. For example, certain branched block copolymers disclosed by Childers require up to 22 hours for preparation and certain rubber-modified styrene polymers employed in the blends of Finestone et al. require up to 14 hours for preparation. Moreover, the impact strengths of blended compositions are generally achieved at the expense of the impact strength of at least one of the components of the blend. Thus, for example, it is shown in Finestone et al. that blending of a rubber-modified styrene polymer having an Izod value of 2.83 ft.-lbs./inch with crystalline polystyrene results in a blended composition having an Izod value of 1.66 ft.-lbs./inch.

Accordingly, it is an object of this invention to provide impact resistant blended compositions which overcome the objections to prior art blends. It is a further object of the invention to provide a method for the preparation of such impact resistant compositions. A further object of this invention is to provide compositions having impact strengths comparable or superior to those of conventional impact resistant rubber-modified styrene polymers containing comparable amounts of rubber at production rates substantially higher than those of such conventional polymers. A still further object of the invention is to provide a method whereby a rubber-modified styrene polymer of inferior or marginal impact strength is upgraded by blending such polymer with a second styrene polymer which is also inferior or marginal in terms of impact strength. Other objects of the invention will be apparent to persons of skill in the art from the following description and claims.

It has now been found that impact resistant compositions can be prepared by blending a high molecular weight styrene polymer with a rubber-modified styrene polymer prepared by mass polymerization of a solution of a rubber in styrene monomer. The impact resistance of such blended compositions is believed to be attributable to the combination of the rubber particles of the latter component and the high molecular weight of the former component. Advantageously, it has been found that rubber-modified styrene polymers prepared at high polymerization rates, while exhibiting Izod impact strengths lower than those which would be expected of rubber-modified styrene polymers prepared at lower conventional polymerization rates using equal amounts of rubber, can be blended with high molecular weight styrene polymers to obtain, at extremely high production rates, blends having Izod impact strengths exceeding not only the respective Izod values of the components thereof, but also, the sum of such Izod values. Moreover, such blends exhibit Izod impact strengths equal or superior to those which would be expected of rubber-modified styrene polymers prepared by conventional mass polymerization techniques using rubber levels comparable to those of the blends, and the time required for preparation of such blends is substantially shorter than the time required for preparation of rubber-modified styrene polymers by conventional mass polymerization techniques.

SUMMARY OF THE INVENTION

Impact resistant compositions according to the present invention comprise a blend of a high molecular weight styrene polymer and a rubber-modified styrene polymer prepared by mass polymerization of a solution of a rubber in styrene monomer. In a preferred embodiment of the invention, a rapidly prepared high molecular weight styrene polymer is blended with a rapidly prepared rubber-modified styrene polymer to obtain an impact resistant blend at an extremely high rate of production.

Blending of the components of the compositions of this invention is accomplished by blending in a mutual solvent for such components and then recovering the blended composition from the solvent, melt mixing such as in an extruder or on a mill, or other means suitable for thoroughly mixing the components in solution or in a molten state.

Impact resistant compositions according to this invention find use in a variety of applications calling for the use of impact resistant thermoplastic materials. Examples of such applications include refrigerator interiors, vacuum cleaner housings, and other articles produced by injection molding, extrusion, and other suitable techniques.

DESCRIPTION OF THE INVENTION

Impact resistant compositions according to this invention comprise a blend of a styrene polymer having a number average molecular weight ranging from about 200,000 to 600,000, and a rubber-modified styrene polymer prepared by mass polymerization of a solution of a rubber in styrene monomer. Component proportions may vary over a wide range to allow for the preparation of impact resistant compositions meeting individual requirements. Generally, such compositions contain from about 40 to 95 wt. % high molecular weight styrene polymer and from about 5 to 60 wt. % rubber-modified styrene polymer.

Styrene polymers suitable for use in the blends of this invention have a number average molecular weight, as determined by gel permeation chromatography, ranging from about 200,000 to 600,000, preferably ranging from about 250,000 to 400,000, and most preferably, of about 300,000. Such molecular weights, being in excess of the number average molecular weights of typical commercial polystyrene resins, are important in that, as set forth hereinabove, the impact strengths of blends according to this invention are believed to be attributable in part to the high molecular weight of the styrene polymers. Such polymers are preferably homopolymers of styrene although small amounts of other copolymerized ethylenically unsaturated monomers also can be present. The high molecular weight styrene polymers employed in the blends of the invention can be prepared by bulk, suspension, solution or other polymerization techniques well known to the art.

Preferably, styrene polymers employed according to this invention are prepared by anionic solution polymerization methods, an example of which is disclosed in U.S. Pat. No. 3,041,312 to Boyd. In anionic polymerization a solution of styrene monomer in an inert organic solvent is polymerized in the presence of an organometallic initiator and the resulting polymer is devolatilized. Suitable solvents include aromatic hydrocarbons and alkyl derivatives thereof such as benzene, toluene, xylenes, ethylbenzene, etc.; cycloaliphatic hydrocarbons and alkyl derivatives thereof, such as cyclohexane, methylcyclohexane, etc.; and saturated aliphatic hydrocarbons containing from 2 to 30 carbon atoms, such as butane, hexane, octane, dodecane, etc. Suitable organometallic initiators include alkali metal salts and ion-radical adducts, with alkyllithium salts being preferred. Initiators are often employed in the form of solutions in inert solvents such as hexane, dimethoxyethane, diethoxyethane, tetrahydrofuran, dioxane, dioxolane, and a variety of aliphatic, cycloaliphatic, and aromatic ethers and hydrocarbons.

It is preferred that the styrene polymers employed in the blends of this invention be anionically prepared because anionic polymerization is particularly suited for the preparation of high molecular weight polymers at high production rates. Moreover, predetermined molecular weights and production rates can be achieved through proper selection of initiators, solvents, and initiator concentrations.

The second component of the blends of this invention is a rubber-modified styrene polymer prepared by mass polymerization of a solution of a rubber in styrene monomer. As is known, mass polymerization proceeds by a free radical mechanism which is initiated thermally and/or by the addition of free radical initiators. Polymerization is generally accomplished by preparing a feedstock comprising a solution of a rubber in styrene monomer in the substantial absence of inert solvent, polymerizing the feedstock under free radical conditions and with agitation, and devolatilizing the resultant polymer. Of course, the polymerization feedstock can also contain conventional additives such as antioxidants, chain transfer agents, lubricants, and the like. The process is typically carried out, over a period of several hours, in stages, with increases in temperature as the polymerization progresses. Rubber-modified styrene polymers prepared by mass polymerization techniques comprise a plurality of discrete rubber particles distributed throughout a matrix of polymerized styrene. Only a minor portion of styrene becomes chemically attached to the rubber during polymerization. The rubber-modified styrene polymers employed in the blends of this invention contain from about 5 to 40 wt. % rubber. Suitable rubbers include any of the rubbers commonly employed in the preparation of impact resistant rubber-modified styrene polymers. Preferred rubbers are polybutadiene rubbers and styrene-butadiene copolymer rubbers.

Rubber-modified styrene polymers preferred for use in the compositions of this invention are polymers prepared by mass polymerization of a solution of a rubber in styrene monomer at high polymerization rates. Although such rapid mass polymerization yields rubber-modified styrene polymers of low molecular weight and poor impact strength as compared with rubber-modified styrene polymers prepared by slower conventional mass polymerization techniques using equal rubber levels, blending of such a rapidly polymerized rubber-modified styrene polymer with a high molecular weight styrene polymer according to this invention results in a blended composition, the impact strength of which exceeds that which would be expected of rubber-modified styrene polymers prepared by conventional mass polymerization techniques and containing amounts of rubber comparable to that contained in the blend.

Preparation of the rapidly polymerized rubber-modified styrene polymers preferred for use in the blends of this invention is accomplished by mass polymerization, in stages, of a solution of a rubber in styrene monomer, at least the early stages of such polymerization being carried out at temperatures in excess of the temperatures employed during the early stages of conventional mass polymerization processes.

Suitably, a first stage of the polymerization is carried out at a temperature exceeding about 110° C., preferably, in order to achieve rapid polymerization while avoiding heat transfer problems, at a temperature ranging from about 130° to 150° C., and most preferably, at about 135° C. A second stage of the polymerization is carried out at a temperature higher than that of the first stage and exceeding about 135° C., preferably ranging from about 140° to 180° C., and most preferably, at about 160° C. One or more subsequent stages of the polymerization can be carried out at a temperature sufficient to achieve full, that is, at least about 95%, conversion of monomer to polymer. Suitable temperatures during such subsequent stage or stages range from about 170° to 230° C. The duration of such first, second, and subsequent polymerization stages varies depending on the temperatures employed during such stages. Generally, the first and second stages can each be carried out over a period of up to about 2 hours, and preferably, over a period of from about 1 to 2 hours. The subsequent stage or stages can be carried out over a total period of up to about 4 hours with about 1 to 3 hours being preferred.

As set forth hereinabove, blends according to this invention contain from about 40 to 95 wt. % high molecular weight styrene polymer and from about 5 to 60 wt. % rubber-modified styrene polymer. Preferably, however, blends of high molecular weight styrene polymer and rapidly polymerized rubber-modified styrene polymer contain from about 55 to 75 wt. % high molecular weight styrene polymer and from about 25 to 45 wt. % rapidly polymerized rubber-modified styrene polymer, preferred rubber levels in such rubber-modified polymers ranging from about 7 to 15 wt. %. It is also preferred that component proportions and rubber levels be selected such that blends of high molecular weight styrene polymers and rapidly polymerized rubber-modified styrene polymers contain from about 2.5 to 8 wt. % rubber, and most preferably, about 4 wt. % rubber.

In a particularly preferred embodiment of the invention, impact resistant blends are prepared at extremely high production rates by blending an anionically polymerized high molecular weight styrene polymer and a rapidly polymerized rubber-modified styrene polymer prepared as described hereinabove. At comparable rubber levels, blends according to this embodiment of the invention not only equal or surpass conventionally prepared impact resistant rubber-modified styrene polymers in Izod impact strength, but also, the blends may be prepared several times faster than such conventional impact resistant polymers in that the components of the blends are not only prepared more rapidly than such conventional polymers, but also, blending serves to extend such components.

Blending according to this invention can be accomplished by a variety of methods known to the art. One such method is solution blending in a mutual solvent for the high molecular weight styrene polymer and the rubber-modified styrene polymer and then recovering the blend from the solvent. Suitable solvents include tetrahydrofuran, methyl ethyl ketone, aromatic hydrocarbons and alkyl derivatives thereof, such as benzene, xylenes, ethylbenzene, and the like; and halogenated aliphatic hydrocarbons such as trichloromethane, and tetrachloromethane. Other suitable blending techniques include blending in an extruder or in a Banbury blender or on a mill, and other methods whereby thorough blending of the components in solution or in a molten state is achieved.

The following example is intended to illustrate, without limiting, a preferred embodiment of this invention.

EXAMPLE 500 grams of styrene in 2500 grams of benzene was anionically polymerized over a period of 10 to 20 minutes in a large glass vessel using as an initiator, 1 ml. of a 1.97 molar solution of n-butyllithium in hexane. The resulting polymer had a notched Izod impact strength of about 0.3 ft.-lbs./inch, a weight average molecular weight of 713,000 and a number average molecular weight of 296,000 as determined on a Waters Model 200 Gel Permeation Chromatograph. A rubber-modified styrene polymer was prepared by rapid mass thermal polymerization, in stages, over a period of 3½ hours, of a solution of 240 grams of a rubber and 2 grams of BHT in 1758 grams of styrene. The polymerization was conducted, with agitation, in a 1 gallon Chemco stainless steel reactor according to the following schedule:

| Stage: | 1 | 2 | 3 | 4 |
|---|---|---|---|---|
| Temperature (°C.): | 135 | 160 | 180 | 210 |
| Time (minutes): | 70 | 70 | 35 | 35 |
| Agitation Rate (r.p.m.) | 50 | 50 | 50 | 50 |

The rubber was a polybutadiene rubber identified as "Diene 35" and manufactured by Firestone Synthetic Rubber and Latex Company. Following polymerization, the resultant rubber-modified styrene polymer was devolatilized. The polymer contained 12 wt. % rubber in the form of discrete particles ranging in size from 2 to 6 microns, and had a notched Izod impact strength, measured at room temperature, of 1.09 ft.-lbs./inch, a weight average molecular weight of 140,000 and a number average molecular weight of 35,000 as determined on a Waters Model 200 Gel Permeation Chromatograph. Two parts of the anionically polymerized styrene polymer were blended with one part of the rapidly prepared rubber-modified styrene polymer in a Brabender extruder. The resultant blend contains 4 wt. % rubber and has a notched Izod impact strength measured at room temperature, of 1.68 ft.-lbs./inch, a weight average molecular weight of 530,000, and a number average molecular weight of 89,000 as determined by gel permeation chromatography.

This example demonstrates that impact resistant compositions can be prepared at extremely high rates according to this invention. The example further illustrates the desirable improvements in impact strength achieved according to the invention in that the blend has a notched Izod value exceeding not only the respective Izod values of each of the components of the blend, but also the sum of the Izod values of such components. It can also be seen from the example that while the rapid preparation of the rubber-modified styrene polymer results in a product having an Izod value inferior to that which would be expected of a rubber-modified styrene containing 12 wt. % rubber and prepared at the slower polymerization rates employed in conventional mass polymerization processes, the blending of the rapidly prepared polymer with the high molecular weight anionically polymerized styrene polymer yields, at an advantageously high production rate, a product having an Izod impact strength superior to that which would be expected of conventional rubber-modified styrene polymers containing 4 wt. % rubber.

It will be appreciated from the foregoing that a variety of modifications of this invention may be made by persons skilled in the art without departing from the scope of the invention as defined herein and in the appended claims.

I claim:

1. An impact resistant blend of components comprising (A) a styrene polymer having a number average molecular weight of about 200,000 to about 600,000 and a first Izod impact strength; and (B) a rubber modified styrene polymer having a second Izod impact strength and prepared by rapid mass polymerization, in stages, of a solution of a rubber in styrene monomer, a first stage of said polymerization being carried out at a temperature in excess of about 110° C., a second stage of said polymerization being carried out at a temperature higher than said first stage temperature and in excess of about 135° C., and at least one subsequent stage of the polymerization being carried out at about 170° to about 230° C. to achieve full conversion of monomer to polymer, said blend having an Izod impact strength which exceeds the sum of said first and second Izod impact strengths.

2. The composition according to claim 1 wherein the styrene polymer is present in the blend in an amount ranging from about 40 to 95 wt. % and the rubber-modified styrene polymer is present in the blend in an amount ranging from about 5 to 60 wt. %.

3. The composition according to claim 2 wherein the rubber-modified styrene polymer contains from about 5 to 40 wt. % of a rubber selected from the group consisting of polybutadiene rubber and styrene-butadiene copolymer rubber.

4. The composition according to claim 3 wherein the styrene polymer having a number average molecular weight ranging from about 200,000 to 600,000 is an anionically polymerized styrene polymer.

5. The composition according to claim 4 wherein the anionically polymerized styrene polymer is present in the blend in an amount ranging from about 55 to 75 wt. % and the rubber-modified styrene polymer is present in the blend in an amount ranging from about 25 to 45 wt. %, such component proportions being selected such that the blend contains from about 2.5 to 8 wt. % rubber.

6. The composition according to claim 5 wherein the anionically polymerized styrene polymer has a number average molecular weight ranging from about 250,000 to 400,000.

7. The composition according to claim 6 wherein the rubber-modified styrene polymer contains from about 7 to 15 wt. % rubber.

8. The composition according to claim 7 wherein the rubber-modified styrene polymer is prepared by rapid mass polymerization, in stages, of a solution of a rubber in styrene monomer, a first stage of said polymerization being carried out at a temperature ranging from about 130° to 150° C. and a second stage of said polymerization being carried out at a temperature higher than said first stage temperature and ranging from about 140° to 180° C., at least one subsequent stage of the polymerization being carried out at a temperature sufficient to achieve full conversion of monomer to polymer.

9. The composition according to claim 8 wherein the blend comprises about two parts of an anionically polymerized styrene polymer having a number average molecular weight of about 300,000 and about one part of a rubber-modified styrene polymer prepared by rapid mass polymerization, in stages, under free radical with agitation, of a solution of about 12 wt. % of a rubber in styrene monomer in the substantial absence of inert solvent, a first stage of said polymerization being carried out over a period ranging from about 1 to 2 hours at a temperature of about 135° C. and a second stage of said polymerization being carried out over a period ranging from about 1 to 2 hours at a temperature of about 160° C., at least one subsequent stage of the polymerization being carried out over a period of up to about 4 hours at a temperature ranging from about 170° to 230° C.

10. A method for producing an impact resistant composition comprising blending components comprising (A) a styrene polymer having a number average molecular weight of about 200,000 to about 600,000 and a first Izod impact strength; and (B) a rubber-modified styrene polymer having a second Izod impact strength and prepared by rapid mass polymerization, in stages, of a solution of a rubber in styrene monomer, a first stage of said polymerization being carried out at a temperature in excess of about 110° C., a second stage of said polymerization being carried out at a temperature higher than said first stage temperature and in excess of about 135° C., and at least one subsequent stage of the polymerization being carried out at about 170° to about 230° C. to achieve full conversion of monomer to polymer, whereby the resulting blend has an Izod impact strength which exceeds the sum of said first and second Izod impact strengths.

11. The method according to claim 10 wherein the mixture comprises from about 40 to 95 wt. % styrene polymer and from about 5 to 50 wt. % rubber-modified styrene polymer.

12. The method according to claim 11 wherein the mixture is blended in a mutual solvent and recovered from the solvent.

13. The method according to claim 11 wherein the mixture is blended in a molten state.

14. The method according to claim 11 wherein the rubber-modified styrene polymer contains from about 5 to 40 wt. % of a rubber selected from the group consisting of polybutadiene rubber and styrene-butadiene copolymer rubber.

15. The method according to claim 14 wherein the styrene polymer having a number average molecular weight ranging from about 200,000 to 600,000 is an anionically polymerized styrene polymer.

16. The method according to claim 15 wherein the mixture comprises from about 55 to 75 wt. % anionically polymerized styrene polymer and from about 25 to 45 wt. % rubber-modified styrene polymer, such component proportions being selected such that the mixture contains from about 2.5 to 8 wt. % rubber.

17. The method according to claim 16 wherein the anionically polymerized styrene polymer has a number average molecular weight ranging from about 250,000 to 400,000.

18. The method according to claim 17 wherein the rubber-modified styrene polymer contains from about 7 to 15 wt. % rubber.

19. The method according to claim 18 wherein the rubber-modified styrene polymer is prepared by rapid mass polymerization, in stages, of a solution of a rubber in styrene monomer, a first stage of said polymerization being carried out at a temperature ranging from about 130° to 150° C. and a second stage of said polymerization being carried out at a temperature higher than said first stage temperature and ranging from about 140° to 180° C., at least one subsequent stage of the polymerization being carried out at a temperature sufficient to achieve full conversion of monomer to polymer.

20. The method according to claim 19 wherein the mixture comprises about two parts of an anionically polymerized styrene polymer having a number average molecular weight of about 300,000 and about one part of a rubber-modified styrene polymer prepared by rapid mass polymerization, in stages, under free radical conditions with agitation, of a solution of about 12 wt. % of a rubber in styrene monomer in the substantial absence of inert solvent, a first stage of said polymerization being carried out over a period ranging from about 1 to 2 hours at a temperature of about 135° C. and a second stage of said polymerization bing carried out over a period ranging from about 1 to 2 hours at a temperature of about 160° C., at least one subsequent stage of the polymerization being carried out over a period of up to about 4 hours at a temperature ranging from about 170° to 230° C.

* * * * *

UNITED STATES PATENT OFFICE
CERTIFICATE OF CORRECTION

Patent No. 4,245,057                    Dated January 13, 1981

Inventor(s)    FRANCIS J. SLAMA

It is certified that error appears in the above-identified patent and that said Letters Patent are hereby corrected as shown below:

| Patent Column | Line | |
|---|---|---|
| Cover Page | Item 56 under References Cited | "Tobana et al." should be --Tabana et al.-- |
| 4 | 25 | "during polymerization. The rubber..." should be --during polymerization. ¶ The rubber...-- |
| 6 | 50-51 | "styrene containing" should be --styrene polymer containing-- |
| 7 | 4 | "rubber modified" should be --rubber-modified-- |
| 7 | 64 | "free radical with" should be --free radical conditions with-- |

UNITED STATES PATENT OFFICE
CERTIFICATE OF CORRECTION

Patent No. 4,245,057　　　　　　　　　Dated January 13, 1981

Inventor(s) FRANCIS J. SLAMA

It is certified that error appears in the above-identified patent and that said Letters Patent are hereby corrected as shown below:

| Patent Column | Line | |
|---|---|---|
| 10 | 4 | "bing" should be --being-- |

Signed and Sealed this

Sixth Day of October 1981

[SEAL]

Attest:

GERALD J. MOSSINGHOFF

Attesting Officer　　　Commissioner of Patents and Trademarks